United States Patent
Keutz et al.

(10) Patent No.: US 6,874,812 B2
(45) Date of Patent: Apr. 5, 2005

(54) AIRBAG MODULE

(75) Inventors: Markus Keutz, Rossdorf (DE); Christian Lorenz, Leidersbach (DE)

(73) Assignee: TRW Automotive Safety Systems GmbH & Co. KG, Aschaffenburg (DE)

( * ) Notice: Subject to any disclaimer, the term of this patent is extended or adjusted under 35 U.S.C. 154(b) by 0 days.

(21) Appl. No.: 10/209,138

(22) Filed: Jul. 31, 2002

(65) Prior Publication Data

US 2003/0042715 A1 Mar. 6, 2003

(30) Foreign Application Priority Data

Aug. 31, 2001 (DE) ...................... 201 14 375 U

(51) Int. Cl.⁷ ............................................. B60R 21/22
(52) U.S. Cl. ................................................. 280/730.1
(58) Field of Search .................... 280/743.2, 730.1, 280/731, 732, 730.2

(56) References Cited

U.S. PATENT DOCUMENTS

| | | | |
|---|---|---|---|
| 5,004,266 A | | 4/1991 | Miller et al. |
| 5,348,343 A | | 9/1994 | Hawthorn |
| 5,364,124 A | * | 11/1994 | Donegan et al. ......... 280/730.1 |
| 5,505,487 A | * | 4/1996 | Brown et al. ............ 280/730.1 |
| 5,540,460 A | * | 7/1996 | Wipasuramonton ...... 280/730.1 |
| 5,727,812 A | * | 3/1998 | Dykstra et al. ............. 280/731 |
| 5,865,466 A | | 2/1999 | Yamamoto et al. |
| 6,022,043 A | * | 2/2000 | Harnisch et al. ......... 280/728.2 |
| 6,206,409 B1 | | 3/2001 | Kato et al. |
| 6,315,321 B1 | | 11/2001 | Lutz |
| 6,325,415 B1 | * | 12/2001 | Zelinski et al. .......... 280/743.2 |

FOREIGN PATENT DOCUMENTS

| | | |
|---|---|---|
| DE | 4217174 | 2/1996 |
| DE | 19511511 | 2/1996 |
| DE | 19631556 | 2/1998 |
| DE | 19846822 | 4/2000 |
| DE | 19846853 | 4/2000 |
| DE | 10019525 | 10/2001 |

* cited by examiner

Primary Examiner—Thomas Price
(74) Attorney, Agent, or Firm—Tarolli, Sundheim, Covell & Tummino L.L.P.

(57) ABSTRACT

An airbag module comprises a housing and an airbag that is arranged in the housing and, at least in sections, folded into a package. A deflection device is provided for the package. The deflection device, the housing and the package are coordinated with each other in such a way that the folded package emerges from the housing in a first direction and is then deflected by means of the deflection device by a predefined angle. There is also proposed a steering wheel including such an airbag module.

20 Claims, 1 Drawing Sheet

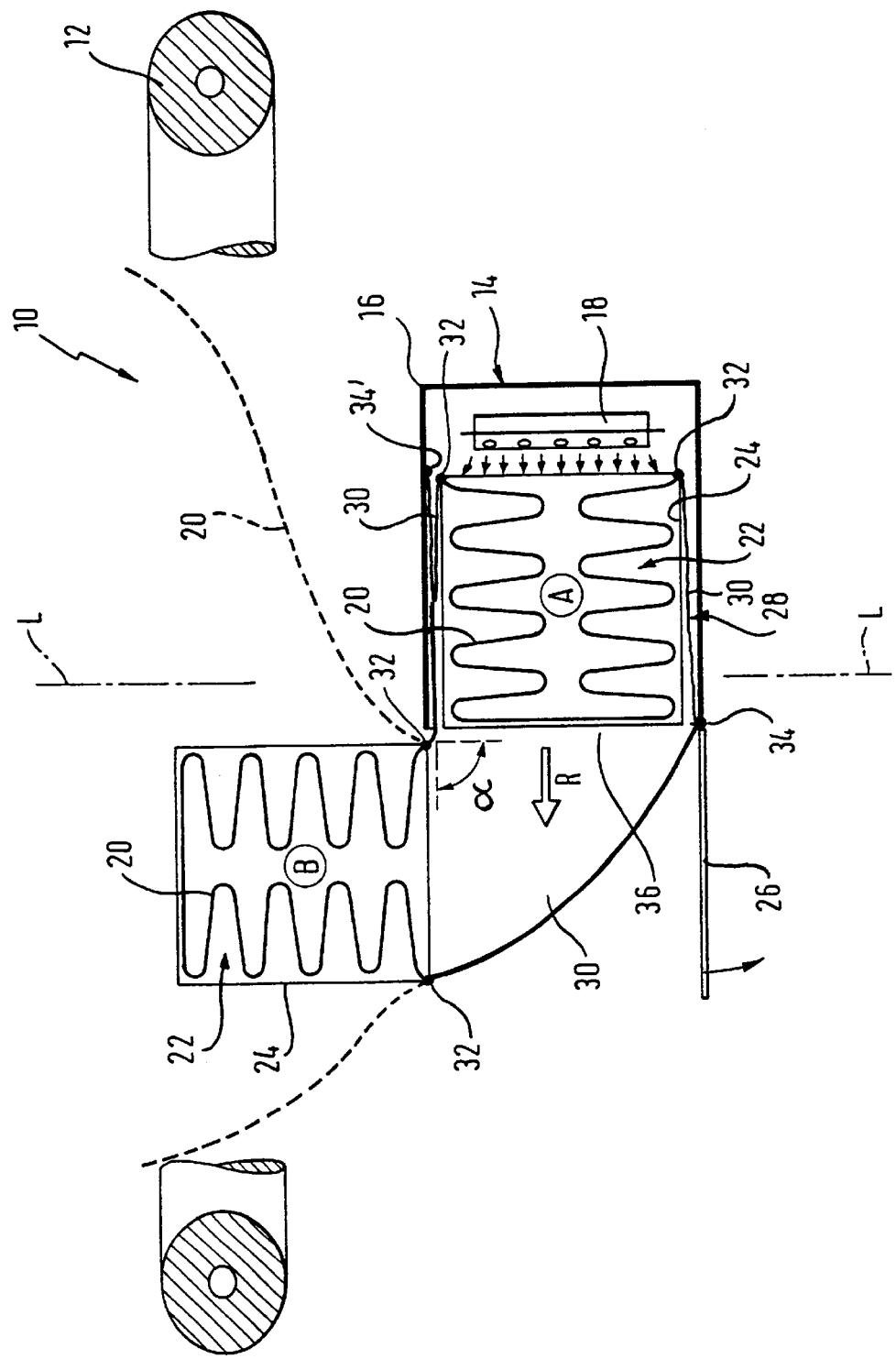

AIRBAG MODULE

TECHNICAL FIELD

The invention relates to an airbag module.

BACKGROUND OF THE INVENTION

An airbag module typically comprises a housing and an airbag that is arranged in the housing and, at least in sections, folded into a package. Airbags concealed under a cover, be it in the steering wheel, in the dashboard or in the vehicle seats, have now become standard equipment in automobiles. The airbag is located in an airbag module and, when activated, it normally emerges from the module in perpendicular direction to the surface under which it is concealed. Therefore, these surfaces have to have flaps or tear lines that should not be at all visible from the outside if possible. This lining of the flaps and tear lines increases the production costs of the vehicle. Moreover, the conventional deployment direction of the airbag, especially in the steering wheel, makes the arrangement of the operating and display elements more difficult in the area of the steering wheel hub meant for this purpose.

BRIEF SUMMARY OF THE INVENTION

According to the invention, an airbag module comprises a housing and an airbag that is arranged in the housing and that is, at least in sections, folded into a package. A deflection device is provided for the package, this increasing the comfort for a vehicle occupant. The deflection device, the housing and the package are coordinated with each other in such a way that the folded package emerges from the housing in a first direction and is then deflected by means of the deflection device by a predefined angle. Through this device, the airbag package can emerge from the housing in any suitable direction, since only after having emerged is the package deflected in the unfolding direction specified for the airbag. The invention also makes it possible to coordinate the unfolding direction for the intended application purpose of the airbag in that the predetermined angle is selected accordingly.

Advantageously, the deflection takes place entirely before the unfolding of the airbag section that has been folded into the package. Therefore, the unfolding direction of the airbag is not influenced during the unfolding but rather, the airbag, folded as a package, is first brought into its unfolding direction and then unfolded in this unfolding direction without being further influenced.

Preferably, the deflection angle is about 90 degrees. This makes it possible to have the airbag package emerge from the housing laterally instead of perpendicular to the surface as in the past and to then deflect it into the conventionally intended unfolding direction.

In a preferred embodiment of the invention, the deflection device is attached to the airbag and to the airbag module. Preferably, the deflection device is a restraint device provided inside the airbag module in relation to the non-activated state. In a preferred embodiment of the invention, the deflection device comprises several tethers; in another preferred embodiment, the deflection device comprises a fabric tube. A flexible deflection device such as a tether or a fabric tube can be arranged in the housing together with the airbag package without any problem and without substantially increasing the space requirement; accommodated in such housing, the deflection device is protected against damage and dirt.

There can also be several restraint devices that engage the package at various points and that hold the sites of the package in the deployed state at differing distances from the module in order to bring about a deflection. In this manner, an uncomplicated deflection device can be provided, which can easily be adapted to various conditions.

Advantageously, the housing can be closed off by a flap, the package which emerges from the housing opening the flap.

Preferably the pressure of the gas released by a gas generator for filling the airbag serves to move the package out of the housing and to deflect the package. This makes it possible to dispense with further drive devices for deflecting the package, which reduces the space requirement and the costs.

In order to hold the package together until it has reached its desired unfolding position after the deflection, the package is preferably surrounded by a sleeve that can be opened by a small force. The sleeve only holds the package together until the deflection has been completed and it is then opened by the unfolding airbag.

The invention also relates to a steering wheel comprising an airbag module, it being preferred that the package emerges from the housing in a direction approximately radially to the steering wheel axis and is deflected approximately in the direction of the steering wheel axis towards the vehicle interior space. As a result, the airbag unfolds in the same direction as with conventional systems, while all of the problems that are associated with an airbag flap situated in the area of the steering wheel hub are avoided.

BRIEF DESCRIPTION OF THE DRAWING

The single FIGURE shows a schematic section through a steering wheel comprising an airbag module according to the invention at various points in time.

DETAILED DESCRIPTION OF THE PREFERRED EMBODIMENT

A steering wheel 10, the rim 12 of which is shown schematically, has an airbag module 14 in the area of its hub. The airbag module 14 contains a housing 16 and a gas generator 18 that is arranged laterally in the housing. Before activation of the airbag module 14, an airbag 20, which is either partially or entirely folded into a package 22, is situated inside the housing 16 (Position A). The package 22 is surrounded by a sleeve 24 that can be opened by a small force. The sleeve 24 serves to hold the package 22 together until the point in time when the unfolding of the airbag 20 is desired. Before the activation of the airbag module 14, the housing 16 is closed off by a lateral flap 26.

The airbag package 22 is connected to a deflection device 28. The deflection device comprises a restraint device, in this case a fabric tube 30. The fabric tube 30 is attached gas-tight to the airbag 20 on the one hand, and gas-tight to the housing 16 on the other hand. The FIGURE shows the attachment to the airbag by first uppermost and lowermost attachment points 32, and shows the attachment to the housing by second attachment points 34, 34', the attachments, however, preferably extending along the closed circumference of the tube at its two ends. The distance of the second attachment points 34, 34' from the housing opening 36 through which the package 22 emerges varies across the circumference of the fabric tube 30. In the case shown here, the uppermost attachment point 34' is further back from the opening 36 than the lower attachment point 34, which is on the opposite side of the housing. At the other end of the fabric tube 30, the latter is attached to the back of the package 22 (attachment points 32).

Prior to the activation of the airbag module, the fabric tube 30 is arranged along the package 22 inside the housing 16. In the lower area of the fabric tube, it is attached to the edge of the housing opening 36, and in the upper area, it is attached to the housing 16 near the back of the package 22.

When the airbag module 14 or rather the gas generator 18 is activated, the pressure of the gas generated by the gas generator 18 that acts on the package 22 presses the package 22 against the flap 26, which is still closed. The flap 26 opens and swivels to the side, as can be seen in FIG. 1, upon which the airbag package 22—still in the folded state and surrounded by the sleeve 24—is pushed out of the housing 16 in a first direction R. The play needed for this is provided by the displacement/unfolding of the fabric tube 30. The fabric tube 30 is preferably made of a gas-tight material so that the entire pressure of the gas generator 18 can act on the airbag package 22.

The deployment direction R is radial to the steering wheel axis L so that the flap, compared to the cover flap of a conventional airbag module, is laterally offset by 90°.

The first attachment points 32, the second attachment points 34, 34' as well as the length of the housing 16 are coordinated with each other in such a way that the fabric tube 30 is not displaced/unfolded in a straight line in direction R, but rather the first attachment points 32 are in positions that are at varying distances from the housing 16 (Position B). In this process, the airbag package 22 emerging from the housing 16 is deflected by the angle α, which is about 90° here. The airbag 20 is now in a position in which its unfolding direction is approximately parallel to the steering wheel axis in a vehicle interior space.

The movement of the airbag package 22 along its deflection path is completed once the fabric tube 30 has extended to its full length. The first attachment points 32 are then held in Position B by the fabric tube 30. The gas pressure, which had previously caused the deflection of the package 22, now fills the airbag 20 through the fabric tube 30, as a result of which the sleeve 24 opens and the airbag can unfold.

As an alternative, instead of the fabric tube, a tether structure with several tethers can be provided, which are attached in an analogous manner to the fabric tube 30. In this case, it is not the entire airbag 20 that is folded into a package 22 but rather a section—the length of which corresponds to the desired displacement path that is predefined by the tethers—already unfolds during the deflection of the package.

It is also possible to provide a rigid, preferably curved guide channel that is moved, for example, out of the housing in order to deflect the airbag package.

By the same token, it would also be conceivable to arrange the deflection device not in the housing, but rather in front of the housing in the vehicle structure, for example, in the case of passenger-side airbag modules or in airbag modules situated in the vehicle seat.

What is claimed is:

1. An air bag module comprising a housing and an air bag that is arranged in said housing and that is, at least in sections, folded into a package, and a deflection device which is provided for said package, said deflection device, said housing and said package being coordinated with each other in such a way that said folded package completely emerges from said housing in a first direction and is then deflected by said deflection device by a predefined angle, said deflection taking place entirely before any unfolding of said airbag sections that have been folded into said package.

2. The air bag module according to claim 1, wherein said deflection takes place entirely before any unfolding of said air bag sections that have been folded into said package.

3. The air bag module according to claim 1, wherein said angle is about 90°.

4. The air bag module according to claim 1, wherein said deflection device is attached to said air bag and to said module throughout inflation and unfolding of said air bag.

5. The air bag module according to claim 1, wherein said deflection device is a restraint device provided inside said air bag module in relation to a non-activated state.

6. The air bag module according to claim 1, wherein several restraint devices are provided that engage said package at various attachment points and that hold said attachment points of said package in said emerged state at differing distances from said module in order to bring about a deflection.

7. The air bag module according to claim 1, wherein said deflection device comprises several tethers.

8. The air bag module according to claim 7, wherein said air bag is inflated via said channel after said package has been deflected.

9. The air bag module according to claim 1, wherein said deflection device comprises a channel which is made of a fabric tube.

10. The air bag module according to claim 1, wherein said housing is closed off by a flap and said package emerging from said housing opens said flap.

11. The air bag module according to claim 1, wherein a pressure of a gas released by a gas generator for filling said air bag causes to move said package out of said housing.

12. The air bag module according to claim 1, wherein, before an unfolding of said air bag, said package is surrounded by a sleeve that can be opened by a small force.

13. A steering wheel including an air bag module which comprises a housing and an air bag that is arranged in said housing and that is, at least in sections, folded into a package, a deflection device being provided for said package and said deflection device, said housing and said package being coordinated with each other in such a way that said folded package completely emerges from said housing in a first direction and is then deflected by said deflection device by a predefined angle.

14. The steering wheel according to claim 13, wherein said package completely emerges from said housing in a direction approximately radially to a steering wheel axis of rotation and is deflected approximately in the direction of said steering wheel axis towards a vehicle interior space so that inflation outlets of a gas generator for inflating the air bag are directed away from the deflected air bag by an angle equal to the predefined angle of deflection.

15. An airbag module comprising:
a housing and an airbag arranged in said housing;
said airbag being, at least in sections, folded into a package; and
a deflection device for said package comprising several restraint devices engaging said package at various first attachment points;
said deflection device, said housing and said package being coordinated with each other in such a way that said folded package completely emerges from said housing in a first direction and is then deflected by said deflection device by a predefined angle;
said restraint devices holding said first attachment points of said package in an emerged state at differing distances from said housing in order to bring about a deflection.

16. The airbag module according to claim 15, wherein said restraint devices have second attachment points fixed to said housing at differing distances to a housing opening.

17. The airbag module according to claim 15, wherein said deflection takes place entirely before any unfolding of said airbag sections that have been folded into said package.

18. An airbag module comprising a housing and an airbag that is arranged in said housing and that is, at least in sections, folded into package, and a deflection device which is provided of said package, said deflection device, said housing and said package being coordinated with each other in such a way that said folded completely emerges from said housing in a first direction and is then deflected by said deflection device by a predefined angle, said deflection device comprising a channel which is made of a fabric tube and which is arranged upstream of said airbag, said airbag being inflated via said channel after said package has been deflected, said channel defining an outer guide wall for inflation gas flowing into said airbag.

19. An airbag module comprising:

a housing;

an airbag arranged in said housing, said airbag being, at least in sections, folded into a package; and a deflection device for said package, said deflection device, said housing, and said package being coordinated with each other in such a way that said folded package completely emerges from said housing in a first direction and is then deflected by said deflection device by a predefined angle, said package being held together by a separate sleeve until after deflection.

20. A steering wheel including an airbag module comprising:

a housing;

an airbag arranged in said housing, said airbag being, at least in sections, folded into a package; and a deflection for said package, said deflection device, said housing and said package being coordinated with each other in such a way that said folded package completely emerges from said housing in a first direction approximately radially to a steering wheel axis of rotation and is then deflected by said deflection device approximately in the direction of said steering wheel axis towards a vehicle interior space.

* * * * *